(12) United States Patent
Oh et al.

(10) Patent No.: US 12,537,304 B2
(45) Date of Patent: Jan. 27, 2026

(54) MULTIPLE LOOP ANTENNAS FOR MAGNETIC FIELD COMMUNICATION SYSTEM AND METHOD OF OPERATING THE SAME

(71) Applicant: ELECTRONICS AND TELECOMMUNICATIONS RESEARCH INSTITUTE, Daejeon (KR)

(72) Inventors: Jung Hoon Oh, Daejeon (KR); Jang Yeol Kim, Daejeon (KR); Hyunjoon Lee, Daejeon (KR); In Kui Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 173 days.

(21) Appl. No.: 18/485,034

(22) Filed: Oct. 11, 2023

(65) Prior Publication Data

US 2024/0136714 A1    Apr. 25, 2024

(30) Foreign Application Priority Data

Oct. 13, 2022  (KR) .................. 10-2022-0131625
May 2, 2023    (KR) .................. 10-2023-0057029
Sep. 19, 2023  (KR) .................. 10-2023-0124930

(51) Int. Cl.
  *H01Q 7/00*     (2006.01)
  *H01Q 1/52*     (2006.01)
  (Continued)

(52) U.S. Cl.
  CPC .............. *H01Q 7/00* (2013.01); *H01Q 1/523* (2013.01); *H01Q 21/00* (2013.01); *H04B 5/24* (2024.01)

(58) Field of Classification Search
  CPC .......... H01Q 1/523; H01Q 21/00; H01Q 7/00; H01Q 7/005; H04B 5/24
  See application file for complete search history.

(56) References Cited

U.S. PATENT DOCUMENTS 8,164,530 B2 * 4/2012 Rhodes .................... H01Q 7/00
                                                343/866
9,444,143 B2 * 9/2016 Nomura .................... H01Q 7/00
(Continued)

FOREIGN PATENT DOCUMENTS

KR      101584800 B1    1/2016
KR      20160056205 A   5/2016
(Continued)

*Primary Examiner* — Thien M Le
(74) *Attorney, Agent, or Firm* — Rabin & Berdo, P.C.

(57) ABSTRACT

Provided is a resonant multi-loop antenna circuit for magnetic field communication. The resonant multi-loop antenna circuit includes a first loop antenna and a second loop antenna arranged substantially on a same plane, and a first/a second matching circuit connected in series to the first and the second loop antenna respectively. The first matching circuit may be configured to minimize reactance of the first loop antenna and the first matching circuit connected in series to each other at a first carrier frequency, the second matching circuit may be configured to minimize the reactance of the second loop antenna and the second matching circuit connected in series to each other at a second carrier frequency, and the first loop antenna and the second loop antenna may be arranged so that a center of the first loop antenna is spaced apart from a center of the second loop antenna by a predetermined distance.

11 Claims, 8 Drawing Sheets

(51) Int. Cl.
*H01Q 21/00* (2006.01)
*H04B 5/24* (2024.01)

(56) References Cited

U.S. PATENT DOCUMENTS

| | | | | |
|---|---|---|---|---|
| 2009/0176465 A1* | 7/2009 | Jenkins | ................ | H04B 1/0458 |
| | | | | 455/121 |
| 2012/0001815 A1* | 1/2012 | Wong | ................... | H01Q 9/0421 |
| | | | | 343/843 |
| 2014/0210682 A1* | 7/2014 | Kao | ........................ | H01Q 7/00 |
| | | | | 343/866 |
| 2015/0002156 A1* | 1/2015 | Leussler | ................ | G01R 33/34 |
| | | | | 324/322 |
| 2021/0036425 A1* | 2/2021 | Jain | ......................... | G02C 7/04 |
| 2021/0194133 A1* | 6/2021 | Lee | ....................... | H01Q 7/005 |
| 2022/0360295 A1* | 11/2022 | Cho | ........................ | H04B 5/72 |
| 2022/0369049 A1* | 11/2022 | Ledingham | ............ | H01Q 1/273 |
| 2024/0333246 A1* | 10/2024 | Liu | ..................... | H03H 7/0115 |

FOREIGN PATENT DOCUMENTS

KR       10-1745779 B1     6/2017
KR      10-2022-0043591 A    4/2022

\* cited by examiner

MULTIPLE LOOP ANTENNAS FOR MAGNETIC FIELD COMMUNICATION SYSTEM AND METHOD OF OPERATING THE SAME

CROSS-REFERENCE TO RELATED APPLICATION

This application claims the benefit of Korean Patent Application No. 10-2022-0131625 filed on Oct. 13, 2022, Korean Patent Application No. 10-2023-0057029 filed on May 2, 2023, and Korean Patent Application No. 10-2023-0124930 filed on Sep. 19, 2023, in the Korean Intellectual Property Office, the entire disclosures of which are incorporated herein by reference for all purposes.

BACKGROUND

1. Field of the Invention

One or more embodiments relate to a magnetic field communication device and a technique for extending a bandwidth of a loop antenna used for magnetic field communication.

2. Description of the Related Art

Recently, Internet of things (IoT) has been applied to various fields ranging from smart home devices to smart factories. As such, IoT is being used to improve work and lifestyle, but electromagnetic wave technology-based IoT cannot provide smooth service because it is not transmitted in media such as underwater or underground. On the other hand, magnetic field communication is less affected by the transmission medium, so unlike radio wave communication, stable communication is possible inside a building, subway, or underwater, but the service reach is short, so a very low frequency (VLF) band of 3 kilohertz (kHz) to 30 kHz is used to compensate for this. Since magnetic field communication uses the VLF band of 3 kHz to 30 kHz, the wireless service distance can be extended, but the frequency bandwidth of the loop antenna used for magnetic field communication is narrow, so there are limitations in providing various wireless services, and accordingly, it is necessary to minimize radio frequency (RF) components for the miniaturization of the magnetic field communication system.

SUMMARY

Embodiments provide a resonant multi-loop antenna circuit that may increase the efficiency of magnetic field communication and expand a communication bandwidth.

Embodiments provide—a method of expanding a communication bandwidth without interference of a radio wave at the minimum distance between antennas when multiple loop antennas are used in a radio wave-based Internet of things (IoT).

The technical goal obtainable from the present disclosure is not limited to the above-mentioned technical goal, and other unmentioned technical goals may be clearly understood from the following description by one of ordinary skill in the art to which the present disclosure pertains.

According to an aspect, there is provided a resonant multi-loop antenna circuit for magnetic field communication. The resonant multi-loop antenna circuit includes a first loop antenna and a second loop antenna arranged substantially on a same plane, a first matching circuit connected in series to the first loop antenna, and a second matching circuit connected in series to the second loop antenna. The first matching circuit may be configured to minimize reactance of the first loop antenna and the first matching circuit connected in series to each other at a first carrier frequency, the second matching circuit may be configured to minimize the reactance of the second loop antenna and the second matching circuit connected in series to each other at a second carrier frequency, and the first loop antenna and the second loop antenna may be arranged so that a center of the first loop antenna is spaced apart from a center of the second loop antenna by a predetermined distance.

According to an embodiment, the first matching circuit may include a capacitor, wherein capacitance of the capacitor of the first matching circuit may be determined by the following equation:

$$f_{c1} = \frac{1}{2\pi\sqrt{L1C1}}$$

where $f_{c1}$ denotes the first carrier frequency, L1 denotes inductance of the first loop antenna, and C1 denotes capacitance of the first matching circuit.

According to an embodiment, the second matching circuit may include a capacitor, wherein capacitance of the capacitor of the second matching circuit may be determined by the following equation:

$$f_{c2} = \frac{1}{2\pi\sqrt{L2C2}}$$

where $f_{c2}$ denotes the second carrier frequency, L2 denotes inductance of the second loop antenna, and C2 denotes capacitance of the second matching circuit.

According to an embodiment, the first loop antenna and the second loop antenna may be arranged to at least partially overlap.

According to an embodiment, the predetermined distance may be a distance that makes mutual inductance between the first loop antenna and the second loop antenna become zero.

According to an embodiment, the resonant multi-loop antenna circuit may further include a third loop antenna arranged substantially on a same plane as the first loop antenna and the second loop antenna, and a third matching circuit connected in series to the third loop antenna. The third matching circuit may be configured to minimize reactance of the third loop antenna and the third matching circuit connected in series to each other at a third carrier frequency. The third loop antenna may be arranged so that a center of the third loop antenna is spaced apart from the center of the first loop antenna and the center of the second loop antenna by a predetermined distance.

According to an embodiment, the third matching circuit may include a capacitor, wherein capacitance of the capacitor of the third matching circuit may be determined by the following equation:

$$f_{c3} = \frac{1}{2\pi\sqrt{L3C3}}$$

where $f_{c3}$ denotes the third carrier frequency, L3 denotes inductance of the third loop antenna, and C3 denotes capacitance of the third matching circuit.

In an embodiment, the first loop antenna, the second loop antenna, and the third loop antenna may be arranged to at least partially overlap.

In an embodiment, the predetermined distance may be a distance that makes mutual inductance between the first loop antenna and the second loop antenna, between the first loop antenna and the third loop antenna, and between the second loop antenna and the third loop antenna, become zero.

According to another aspect, there is provided a resonant multi-loop antenna circuit for magnetic field communication. The resonant multi-loop antenna circuit includes a plurality of loop antennas arranged substantially on a same plane, and matching circuits connected in series to the plurality of loop antennas, respectively. The matching circuits may be respectively associated with carrier frequencies, and each of the matching circuits may be configured to minimize reactance of a series connection of a corresponding matching circuit and a loop antenna connected in series to the corresponding matching circuit at the associated carrier frequency. The plurality of loop antennas may be arranged so that centers of the plurality of loop antennas may be spaced apart from each other by a predetermined distance.

According to an embodiment, the predetermined distance may be a distance that makes mutual inductance between may be one of the plurality of loop antennas and another one of the plurality of loop antennas become zero.

Additional aspects of embodiments will be set forth in part in the description which follows and, in part, will be apparent from the description, or may be learned by practice of the disclosure.

According to embodiments, there is a technical effect of providing a resonant multi-loop antenna circuit that may increase the efficiency of magnetic field communication and expand a communication bandwidth.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
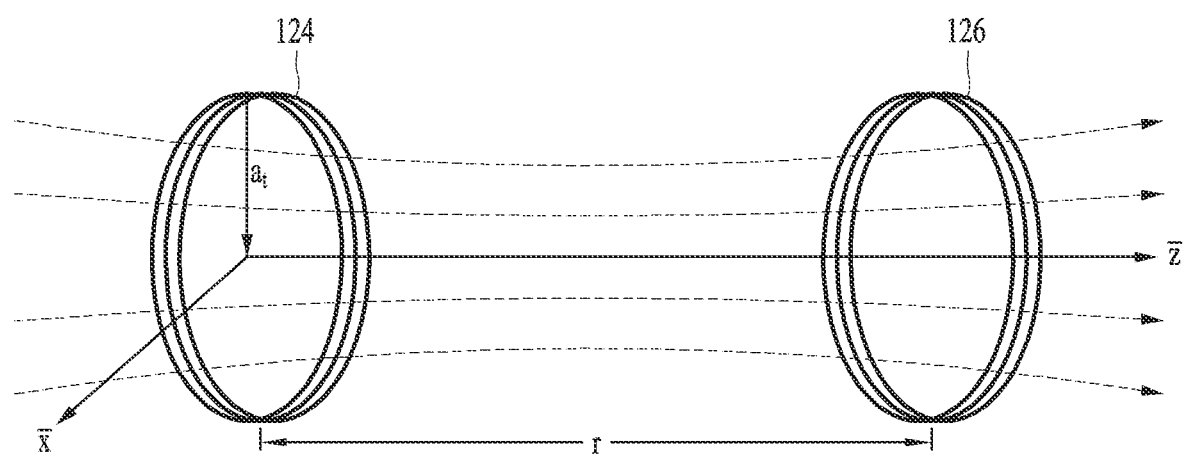
FIG. 1 is a diagram illustrating the principle of magnetic field communication using loop antennas.

The following detailed structural or functional description is provided as an embodiment only and various alterations and modifications may be made to embodiments. Here, the embodiments are not construed as limited to the disclosure and should be understood to include all changes, equivalents, and replacements within the idea and the technical scope of the disclosure.

Terms, such as "first", "second", and the like, may be used herein to describe components. Each of these terminologies is not used to define an essence, order or sequence of a corresponding component but used merely to distinguish the corresponding component from other component(s). For example, a "first" component may be referred to as a "second" component, or similarly, and the "second" component may be referred to as the "first" component within the scope of the right according to the concept of the present disclosure.

When it is mentioned that one component is "connected" or "accessed" to another component, it may be understood that the one component is directly connected or accessed to another component or that still other component is interposed between the two components. Likewise, expressions, for example, "on", "upper", "between" and "adjacent to" may also be construed as described in the foregoing.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical or scientific terms have the same meaning as commonly understood by one of ordinary skill in the art to which embodiments belong. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating the principle of magnetic field communication using loop antennas.

As illustrated in FIG. 1, for magnetic field communication, a transmitting loop antenna 124 is installed on the transmitter side and a receiving loop antenna 126 is installed and used on the receiver side. As illustrated, when a current according to a transmission signal flows through the transmitting loop antenna 124, a magnetic field is generated, and the receiving loop antenna 126 located at a distance r from the transmitting loop antenna 124 detects the magnetic field, converts the magnetic field back into current or voltage, and restores the transmission signal transmitted from the transmitter side to achieve communication.

The magnetic field detected by the receiving loop antenna 126 may be expressed as Equation 1 below.

$$B_z = \frac{\mu_0 N I a_t^2}{2(r^2 + a_t^2)^{3/2}} \hat{z}$$ [Equation 1]

Here, $B_z$ denotes the magnetic field density in the z direction detected by the receiving loop antenna 126, $\mu_0$ denotes magnetic permeability, N denotes the number of turns of the transmitting loop antenna 124, I denotes current flowing through the transmitting loop antenna 124, $a_t$ denotes the radius of the transmitting loop antenna 124, and r denotes the distance between the transmitting loop antenna 124 and the receiving loop antenna 126.

As shown in Equation 1 above, the strength $B_z$ of the receiving magnetic field detected by the receiving loop antenna 126 rapidly decreases to −18 dB as the distance doubles in inverse proportion to $r^3$. Therefore, for long-distance communication, the strength of the current I flowing through the transmitting loop antenna 124 and the antenna cross-sectional area $a_t$ of the transmitting loop antenna 124 may need to be increased. When the current flowing through the transmitting loop antenna 124 is doubled, for example, a magnetic field strength gain of 6 dB may be obtained, but system power efficiency may decrease. When the antenna cross-sectional area of the transmitting loop antenna 124 is increased, the volume of the communication system becomes bulky and practicality reduces. Therefore, the present disclosure provides a method of increasing the maximum magnetic field strength while being less than the sum of the areas of each antenna by using overlapping multiple loop antennas.

Figure 2:
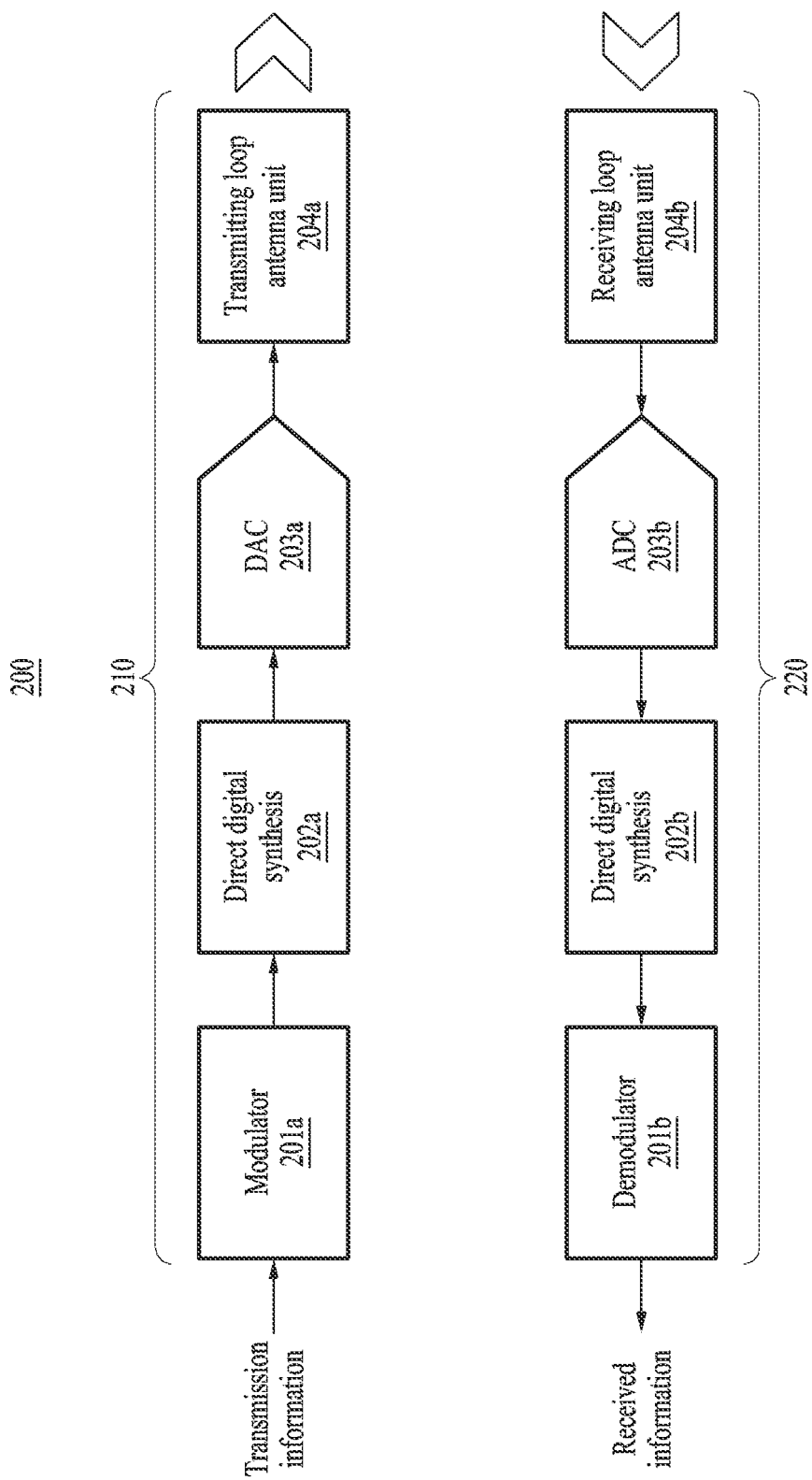
FIG. 2 is a block diagram illustrating an example of a magnetic field communication system according to an embodiment.

FIG. 2 is a block diagram illustrating an example of a magnetic field communication system according to an embodiment.

As illustrated in FIG. 2, a magnetic field communication system 200 may include a transmitter 210. The transmitter 210 may include a modulator 201a, a direct digital synthesis (DDS) 202a, a digital to analog converter (DAC) 203a, and a transmitting loop antenna unit 204a. The modulator 201a may be configured to modulate data of transmission information and output a modulated digital signal. The DDS 202a may be configured to carrier modulate the modulated digital signal into a carrier signal having a specific carrier frequency and output a carrier modulated signal. The DAC 203a may be configured to convert the carrier modulated signal into an analog signal. The transmitting loop antenna unit 204a may be configured to convert the converted analog signal into a magnetic field.

The magnetic field communication system 200 may further include a receiver 220. The receiver 220 may include a receiving loop antenna unit 204b, an analog to digital converter (ADC) 203b, a DDS 202b, and a demodulator 201b. The receiving loop antenna unit 204b may be configured to convert the detected magnetic field into an electrical signal of current or voltage. The ADC 203b may be configured to convert the electrical signal from the receiving loop antenna unit 204b into a digital signal. The DDS 202b may be configured to carrier demodulate the digital signal from the ADC 203b to provide a carrier demodulated signal. The demodulator 201b may be configured to provide received information obtained by restoring transmission information by data demodulating the carrier demodulated signal.

By applying the DDS 202a and the DDS 202b to the present disclosure, nonlinearity that may occur by using an analog RF mixer, output signal error due to the interaction between elements, band distortion, tracking errors may be eliminated, so that the system efficiency increases.

Figure 3:
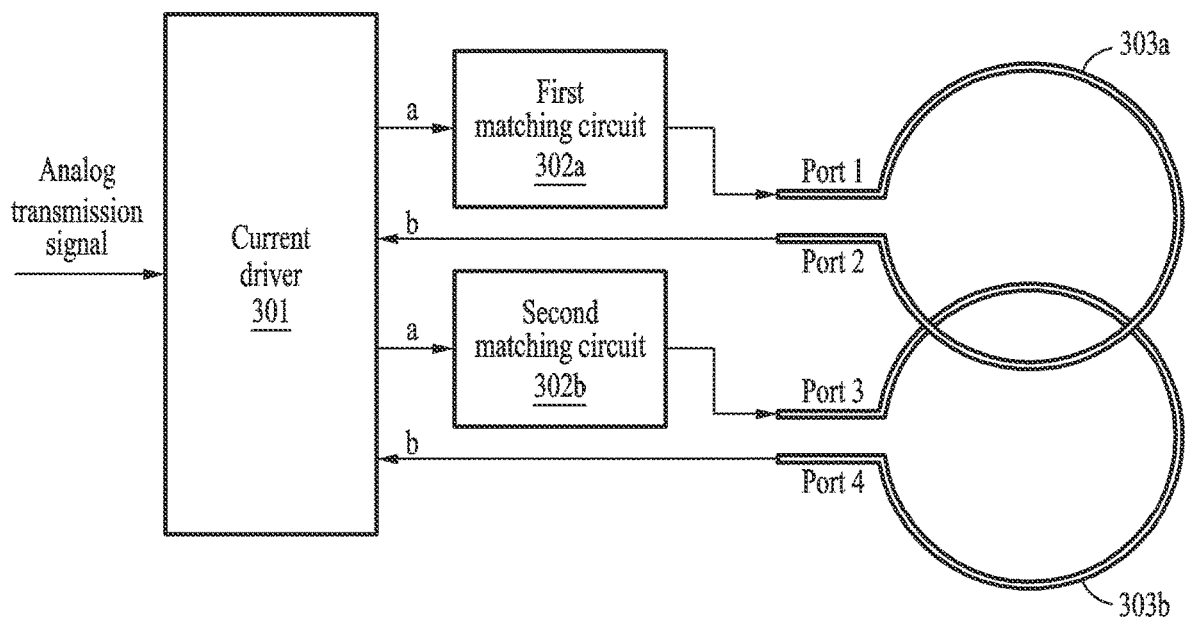
FIG. 3 is a diagram illustrating a configuration of an example of a transmitting loop antenna unit of FIG. 2 according to an embodiment.

FIG. 3 is a diagram illustrating a configuration of an example of a transmitting loop antenna unit of FIG. 2 according to an embodiment.

Referring to FIG. 3, the transmitting loop antenna unit 204a may include a current driver 301 having output terminals a and b, a first matching circuit 302a connected to the output terminal a of the current driver 301, a second matching circuit 302b connected to the output terminal a of the current driver 301, a first loop antenna 303a having ports 1 and 2 and connected in series to the first matching circuit 302a through the port 1 and connected to the output terminal b of the current driver 301 through the port 2, and a second loop antenna 303b having ports 3 and 4 and connected in series to the second matching circuit 302b through the port 3 and connected to the output terminal b of the current driver 301 through the port 4. The first matching circuit 302a and the first loop antenna 303a are included in a resonant loop antenna circuit according to the present disclosure. The second matching circuit 302b and the second loop antenna 303b are included in the other resonant loop antenna circuit according to the present disclosure. The two resonant loop antenna circuits are included in the resonant multi-loop antenna circuit according to the present disclosure. The current driver 301 may operate to drive the first loop antenna 303a and the second loop antenna 303b by outputting current to the output terminals a and b in response to an input analog transmission signal.

Figure 4:
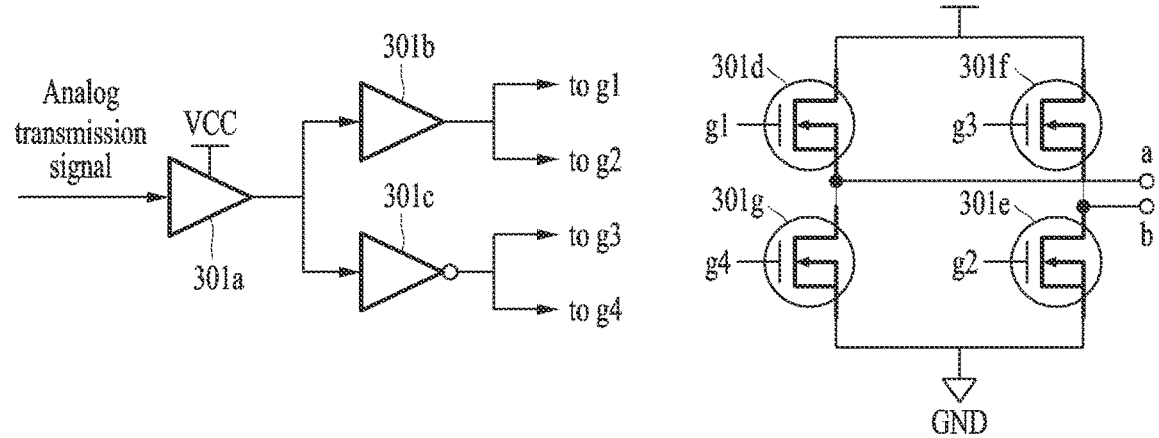
FIG. 4 is a diagram illustrating a configuration of an example of a current driver of FIG. 3 according to an embodiment.

Referring to FIG. 4 illustrating a configuration of an example of the current driver 301 of FIG. 3 according to an embodiment, the current driver 301 may include a comparator 301a configured to output, for example, a first voltage that is a positive voltage VCC when comparing the input analog transmission signal with the reference potential 0 V and the analog transmission signal is equal to or higher than the reference potential, and output, for example, a second voltage that is 0 V when the analog transmission signal is less than the reference potential. The current driver 301 may further include a buffer 301b and an inversion buffer 301c both connected to the comparator 301a. The buffer 301b may be configured to output a positive voltage VCC in response to the input of the first voltage and to output a voltage of 0 V in response to the input of the second voltage. The inversion buffer 301c may be configured to output a voltage of 0 V in response to the input of the first voltage and to output a positive voltage VCC in response to the input of the second voltage. The current driver 301 may further include an H-bridge circuit. As shown, the H-bridge circuit may include four n-channel metal-oxide-semiconductor field-effect transistors (MOSFETs) 301d, 301e, 301f, and 301g connected in an H shape. The gate terminal g1 of the MOSFET 301d may be connected to the output of the buffer 301b. The gate terminal g2 of the MOSFET 301e may be connected to the output of the buffer 301b. The gate terminal g3 of the MOSFET 301f may be connected to the output of the inversion buffer 301c. The gate terminal g4 of the MOSFET 301g may be connected to the output of the inversion buffer 301c. As shown, the H-bridge circuit may be connected to the power supply voltage (VDD) and the ground terminal (GND).

Referring to FIGS. 3 and 4 together, when the analog transmission signal is equal to or higher than the reference potential, the comparator 301a outputs a first voltage, the buffer 301b outputs a positive voltage, and the inversion buffer 301c outputs a voltage of 0 V. Then, the positive voltage is supplied to the gate terminal g1 of the MOSFET 301d and the gate terminal g2 of the MOSFET 301e of the H-bridge circuit to turn on the MOSFET 301d and the MOSFET 301e, and the voltage of 0 V is supplied to the gate terminal g3 of the MOSFET 301f and the gate terminal g4 of the MOSFET 301g to turn off the MOSFET 301f and the MOSFET 301g. Accordingly, a current path is formed through the VDD, the MOSFET 301d, the output terminal a, the first matching circuit 302a, the first loop antenna 303a, the output terminal b, the MOSFET 301e, and the GND, and in the same manner, a current path is formed through the VDD, MOSFET 301d, the output terminal a, the second matching circuit 302b, the second loop antenna 303b, the output terminal b, the MOSFET 301e, and the GND. On the one hand, when the analog transmission signal is less than the reference potential, the comparator 301a outputs a second voltage, the buffer 301b outputs a voltage of 0 V, and the inversion buffer 301c outputs a positive voltage. Then, the voltage of 0 V is supplied to the gate terminal g1 of the MOSFET 301d and the gate terminal g2 of the MOSFET 301e of the H-bridge circuit to turn off the MOSFET 301d and the MOSFET 301e, and the positive voltage is supplied to the gate terminal g3 of the MOSFET 301f and the gate terminal g4 of the MOSFET 301g to turn on the MOSFET 301f and the MOSFET 301g. Accordingly, a current path is formed through the VDD, the MOSFET 301f, the output terminal b, the first loop antenna 303a, the first matching circuit 302a, the output terminal a, the MOSFET 301g, and the GND, and in the same manner, a current path is formed through the VDD, the MOSFET 301f, the output terminal b, the second loop antenna 303b, the second matching circuit 302b, the output terminal a, the MOSFET 301g, and the GND. As such, the direction of the current flowing through the first loop antenna 303a and the second loop antenna 303b changes depending on whether the input analog transmission signal is equal to or higher or less than the reference potential (0 V), and when the direction of the current changes, the direction of the generated magnetic field also changes.

The relationship between the current flowing through the first loop antenna 303a or the second loop antenna 303b and the VDD may be expressed by Equation 2 below.

$$VDD = I_L \times (R_{MOSFET\_ON} \times 2 + X_L)$$ [Equation 2]

$$X_L = Rs + jXs$$ [Equation 3]

Here, $I_L$ denotes a current flowing through the first loop antenna 303a or the second loop antenna 303b, $R_{MOSFET\_ON}$ denotes the turn-on resistance of the MOSFETs 301d, 301e, 301f, and 301g of the H-bridge circuit, $X_L$ denotes the impedance of the first loop antenna 303a or the second loop antenna 303b, Rs denotes the resistance component of $X_L$, and Xs denotes the reactance component of $X_L$.

Since the turn-on resistance of the MOSFETs 301d, 301e, 301f, and 301g of the H-bridge circuit is generally tens of milliohms and thus very small, as shown in the above equations, when the impedance $X_L$ of the first loop antenna 303a or the second loop antenna 303b is reduced, a high current may flow through the first loop antenna 303a or the second loop antenna 303b under the given VDD. In the present disclosure, as illustrated in FIG. 3, the first matching circuit 302a and the second matching circuit 302b are added to the transmitting loop antenna unit 204a to minimize the reactance of the first loop antenna 303a and the first matching circuit 302a connected in series to each other at the first carrier frequency, that is, converging to 0, and in the same manner, to minimize the reactance of the second loop antenna 303b and the second matching circuit 302b connected in series to each other at the second carrier frequency, that is, converging to 0. When the reactance of the first loop antenna 303a and the first matching circuit 302a converges to zero at the first carrier frequency, the first loop antenna 303a and the first matching circuit 302a resonate at the first carrier frequency and the maximum current flows through the first loop antenna 303a. Similarly, when the reactance of the second loop antenna 303b and the second matching circuit 302b converges to zero at the second carrier frequency, the second loop antenna 303b and the second matching circuit 302b resonate at the second carrier frequency and the maximum current flows through the second loop antenna 303b.

When a carrier frequency and bandwidth of a magnetic field communication system are defined as $f_c$ and BW, respectively, when a carrier frequency and bandwidth of the first loop antenna are defined as $f_{c1}$ and BW1, respectively, and when a carrier frequency and bandwidth of the second loop antenna are defined as $f_{c2}$ and BW2, respectively, C1 and C2 may be determined so that $f_{c1} = f_c - BW1/4$ and $f_{c2} = f_c + BW1/4$ may be established and that the resonance may occur at $f_{c1}$ and $f_{c2}$. For example, the bandwidth BW1 of the first loop antenna 303a and the bandwidth BW2 of the second loop antenna 303b may be identical to each other. By setting $f_{c1}$ and $f_{c2}$ as $f_{c1} = f_c - BW1/4$ and $f_{c2} = f_c + BW1/4$, respectively, the bandwidth of the first loop antenna 303a and the bandwidth of the second loop antenna 303b may be made to overlap each other by 50%. In this case, the bandwidth of the magnetic field communication system (e.g., a resonant multi-loop antenna circuit (e.g., $BW = f_{c2max} - f_{c1min} = (f_{c2} + BW1/4) - (f_{c1min} - BW1/4) = BW1 + BW1/2$)) may be a bandwidth that is expanded by 50% than a bandwidth (e.g., the bandwidth BW1 of the first loop antenna 303a and the bandwidth BW2 of the second loop antenna 303b) of a single loop antenna.

In an embodiment, each of the first matching circuit 302a and the second matching circuit 302b may be implemented as a capacitor. In this embodiment, given the carrier frequency, the capacitance of the capacitor may be determined by Equation 4 below.

$$f_c = \frac{1}{2\pi\sqrt{LC}}$$ [Equation 4]

Here, $f_c$ denotes the carrier frequency, L denotes the inductance of the first loop antenna 303a or the second loop antenna 303b, and C denotes the capacitance of the capacitor of the first matching circuit 302a or the second matching circuit 302b.

As described above, when a third loop antenna is added to the resonant multi-loop antenna circuit, one loop antenna is matched to the resonant frequency of the system and the remaining loop antennas have resonant frequencies respectively at the locations separated by ½ of the system bandwidth from the resonant frequency of the system. Therefore, a mutual impedance (e.g. a mutual impedance between the first loop antenna and the second loop antenna, a mutual impedance between the second loop antenna and the third loop antenna, and a mutual impedance between the third loop antenna and the first loop antenna) between respective loop antennas may be zero and the resonant frequency of each loop antenna may independently secure a bandwidth twice greater than that of a single loop antenna. This will be described in detail with reference to FIG. 6.

The first loop antenna 303a and the second loop antenna 303b may be arranged substantially on the same plane. With this arrangement, the volume of the antenna may be minimized. In the present disclosure, when the first loop antenna 303a and the second loop antenna 303b are arranged "substantially" on the same plane, this means not only the case where the first loop antenna 303a and the second loop antenna 303b are arranged completely on the same plane but also the case where they are arranged on the same plane within an error range. In the present disclosure, the reason for using two loop antennas, the first loop antenna 303a and the second loop antenna 303B, as illustrated in FIG. 3 is to expand the bandwidth of a loop antenna. As described above, when the loop antenna is operated in a resonance type, the bandwidth is very narrow because the loop antenna has a high quality factor (Q). In order to compensate for this, the bandwidth may be increased by reducing the Q value by inserting resistance, but the power efficiency is deteriorated because power consumption occurs due to the inserted resistance. Therefore, in the present disclosure, in order to expand the bandwidth of the resonant loop antenna, two resonant loop antennas, that is, the first loop antenna 303a and the second loop antenna 303b, are used to expand the bandwidth. As illustrated in FIG. 3, the first loop antenna 303a and the second loop antenna 303b may be arranged to at least partially overlap.

Figure 5:
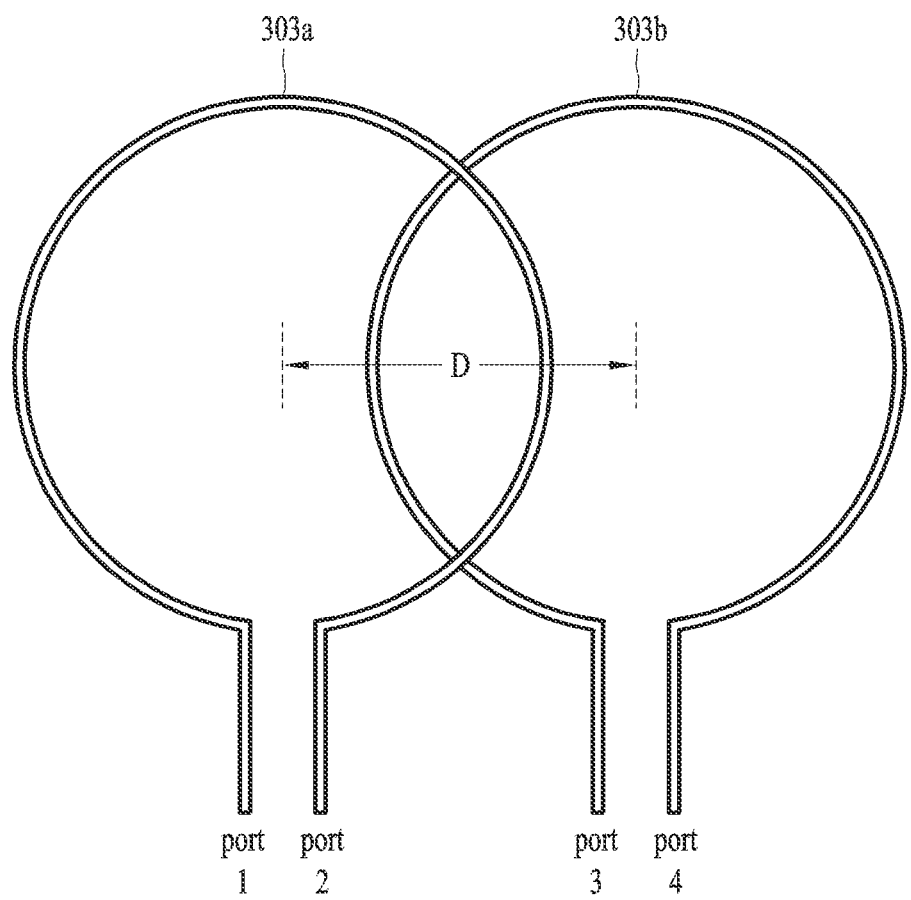
FIG. 5 is a diagram illustrating a method of arranging loop antennas according to an embodiment.

As illustrated in FIG. 5, which is a diagram illustrating a method of arranging loop antennas according to an embodiment, the first loop antenna 303a and the second loop antenna 303b may be arranged so that the center of the first loop antenna 303a is spaced apart from the center of the second loop antenna 303b by a predetermined distance D. The predetermined distance D may be a distance that makes mutual inductance between the first loop antenna 303a and the second loop antenna 303b become zero. When the first loop antenna 303a and the second loop antenna 303b are arranged to overlap and their centers are spaced apart by the predetermined distance D, the maximum magnetic field may be generated without mutual interference between the antennas while occupying the minimum area.

The predetermined distance D from the center of the first loop antenna 303a to the center of the second loop antenna 303b that makes the mutual inductance between the first loop antenna 303a and the second loop antenna 303b become zero may be determined by performing the following procedure.

(i) The first loop antenna 303a and the second loop antenna 303b are arranged to overlap so that the distance from the center of the first loop antenna 303a to the center of the second loop antenna 303b becomes a specific value.

(ii) In FIG. 5, ports 2 and 3 are connected to each other and the inductance Lx between ports 1 and 4 is measured.

(iii) In FIG. 5, ports 2 and 4 are connected to each other and the inductance Ly between ports 1 and 3 is measured.

(iv) Find the minimum distance that satisfies the relationship Lx=Ly, that is, the mutual inductance M=(Lx−Ly)/4 between the first loop antenna 303a and the second loop antenna 303b becomes zero by repeating operations (i) to (ii) while changing the above distance, and determine this distance as the predetermined distance D.

Figure 6:
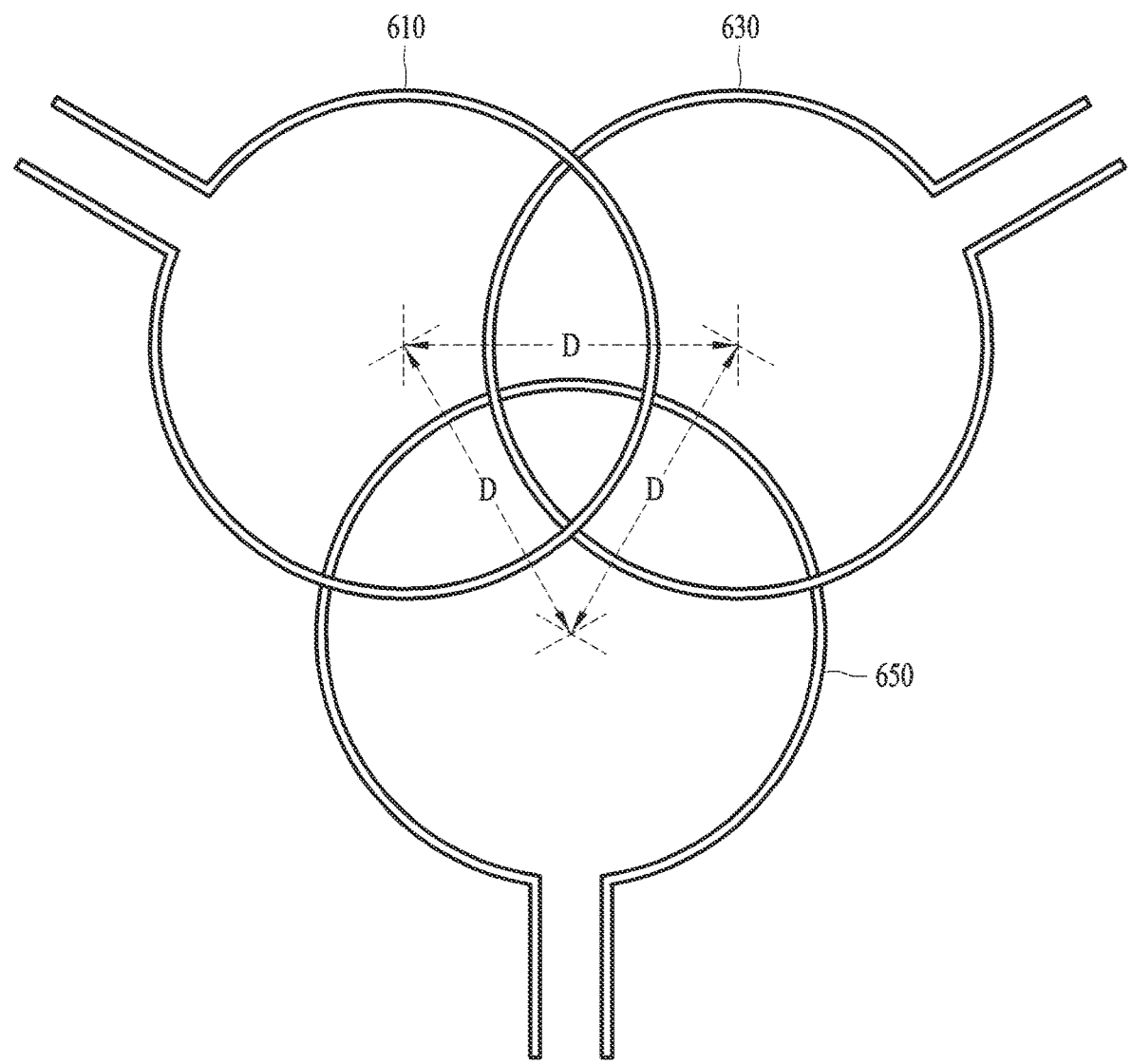
FIG. 6 is a diagram illustrating a method of arranging loop antennas according to an embodiment.

In the above, an embodiment of configuring a resonant multi-loop antenna circuit by two loop antennas and two matching circuits connected in series respectively has been described, but those skilled in the art will recognize that embodiments including a resonant multi-loop antenna circuit by three or more loop antennas and matching circuits connected in series respectively and these embodiments are also included within the scope of the present disclosure. Even in these embodiments, as illustrated in FIG. 6, which is a diagram illustrating a method of arranging loop antennas according to an embodiment, the centers of three or more loop antennas are arranged to be spaced apart from each other by the predetermined distance D, using the distance D obtained from the two loop antennas. In addition, the predetermined distance D in these embodiments may be determined as a distance that makes the mutual inductance between any one of the three or more loop antennas and the other one of the three or more loop antennas become zero.

For example, the resonant multi-loop antenna circuit may include a first loop antenna 610, a second loop antenna 630, and a third loop antenna 650 that are substantially arranged on the same plane. The resonant multi-loop antenna circuit may include the first matching circuit 302a, the second matching circuit 302b, and a third matching circuit (not shown). The first matching circuit 302a, the second matching circuit 302b, and the third matching circuit (not shown) may be connected in series to the first loop antenna 610, the second loop antenna 630, and the third loop antenna 650, respectively. The first loop antenna 610, the second loop antenna 630, and the third loop antenna 650 may be arranged so that their respective centers may be spaced apart from each other by a predetermined distance (e.g., the distance D). Here, the predetermined distance D may be a distance that makes the mutual inductance (e.g., the mutual impedance between the first loop antenna and the second loop antenna, the mutual impedance between the second loop antenna and the third loop antenna, and the mutual impedance between the third loop antenna and the first loop antenna) between the loop antennas (e.g., the first loop antenna 610, the second loop antenna 630, and the third loop antenna 650) become zero. The method of obtaining the predetermined distance D has been described in detail with reference to FIG. 5 and will be omitted here.

A bandwidth of a resonant loop antenna may be expanded by making the loop antennas overlap each other. The bandwidth of the resonant loop antenna may be obtained based on carrier frequencies of the loop antenna. For example, the carrier frequency and bandwidth of the first loop antenna 610 may be defined as $f_{c1}$ and BW1, respectively, the carrier frequency and bandwidth of the second loop antenna 630 may be defined as $f_{c2}$ and BW2, respectively, and the carrier frequency and bandwidth of the third loop antenna 650 may be defined as $f_{c3}$ and BW3, respectively. In order to make the inductance $L_1$ of the first loop antenna 610, the inductance $L_2$ of the second loop antenna 630, and the inductance $L_3$ of the third loop antenna 650 be equal to each other, and in order to make the bandwidths between the loop antennas overlap by 50% using values of capacitances $C_1$, $C_2$, and $C_3$, $f_{c1}$ and $f_{c3}$ may be set as Equations 5 and 6 below based on $f_{c2}$.

$$f_{c1}=f_{c2}-BW1/2 \quad \text{[Equation 5]}$$

$$f_{c3}=f_{c2}+BW1/2 \quad \text{[Equation 6]}$$

When $f_{c1}$ and $f_{c3}$ are set as in Equations 5 and 6, the bandwidth (e.g., $f_{c3max} - f_{c1min} = (f_{c3} + BW1/2) - (f_{c1min} - BW1/2) = 2*BW1$) of the resonant multi-loop antenna circuit may be expanded by twice a bandwidth (e.g., the bandwidth BW1) of a single loop antenna.

In an embodiment, each of the first matching circuit 302a, the second matching circuit 302b, and the third matching circuit (not shown) may be implemented with a capacitor. The method of obtaining the capacitance of the capacitors of the first matching circuit 302a, the second matching circuit 302b, and the third matching circuit (not shown) has been described in detail with reference to Equation 4, and will be omitted here.

Figure 7:
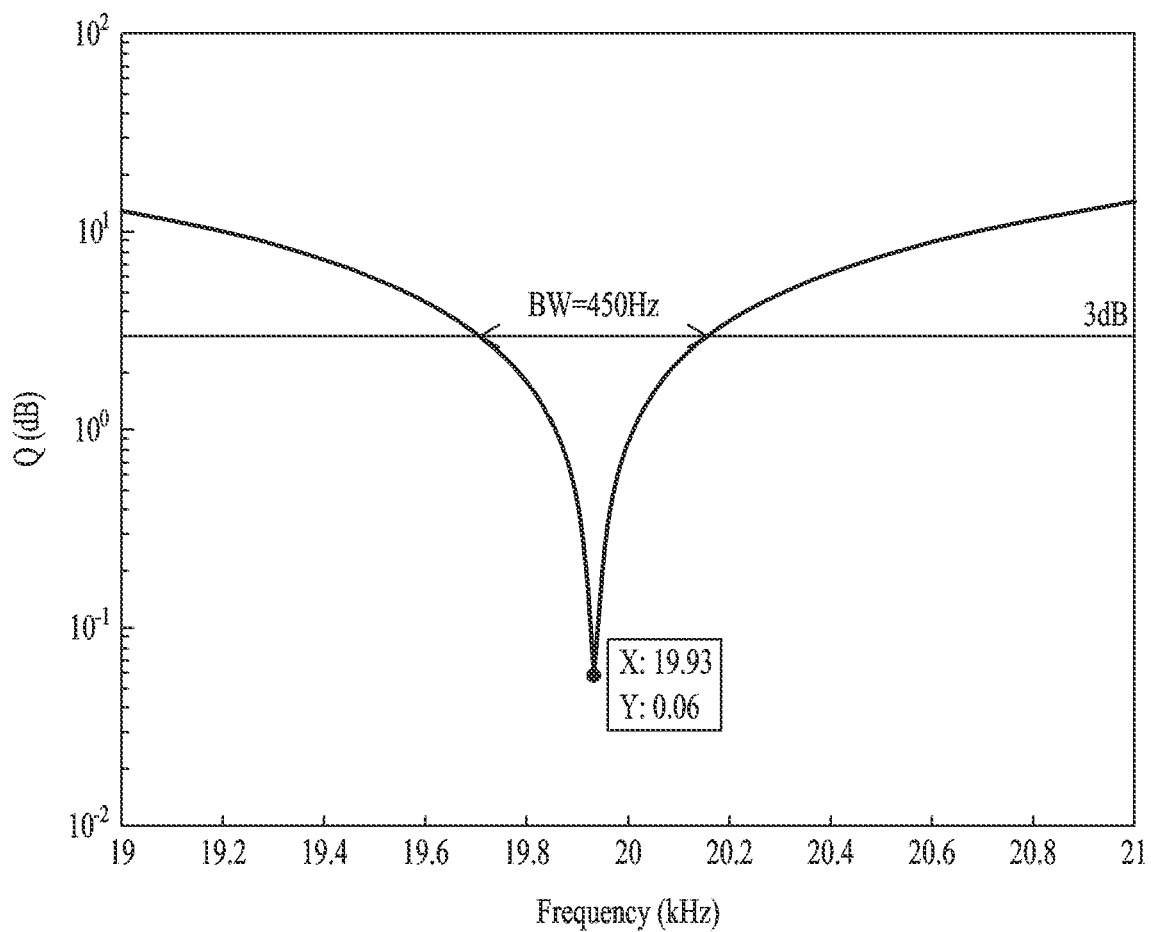
FIG. 7 is a graph illustrating Q values according to a plurality of frequencies measured with an inductance, capacitance, and resistance (LCR) meter for a resonant loop antenna circuit including a first matching circuit and a first loop antenna of FIG. 3.

FIG. 7 illustrates the measured Q value according to the frequency of a first loop antenna with a resonant frequency $f_{c1}$ of 19.74 kilohertz (kHz), measured at a bandwidth (BW1)=490 hertz (Hz).

Figure 8:
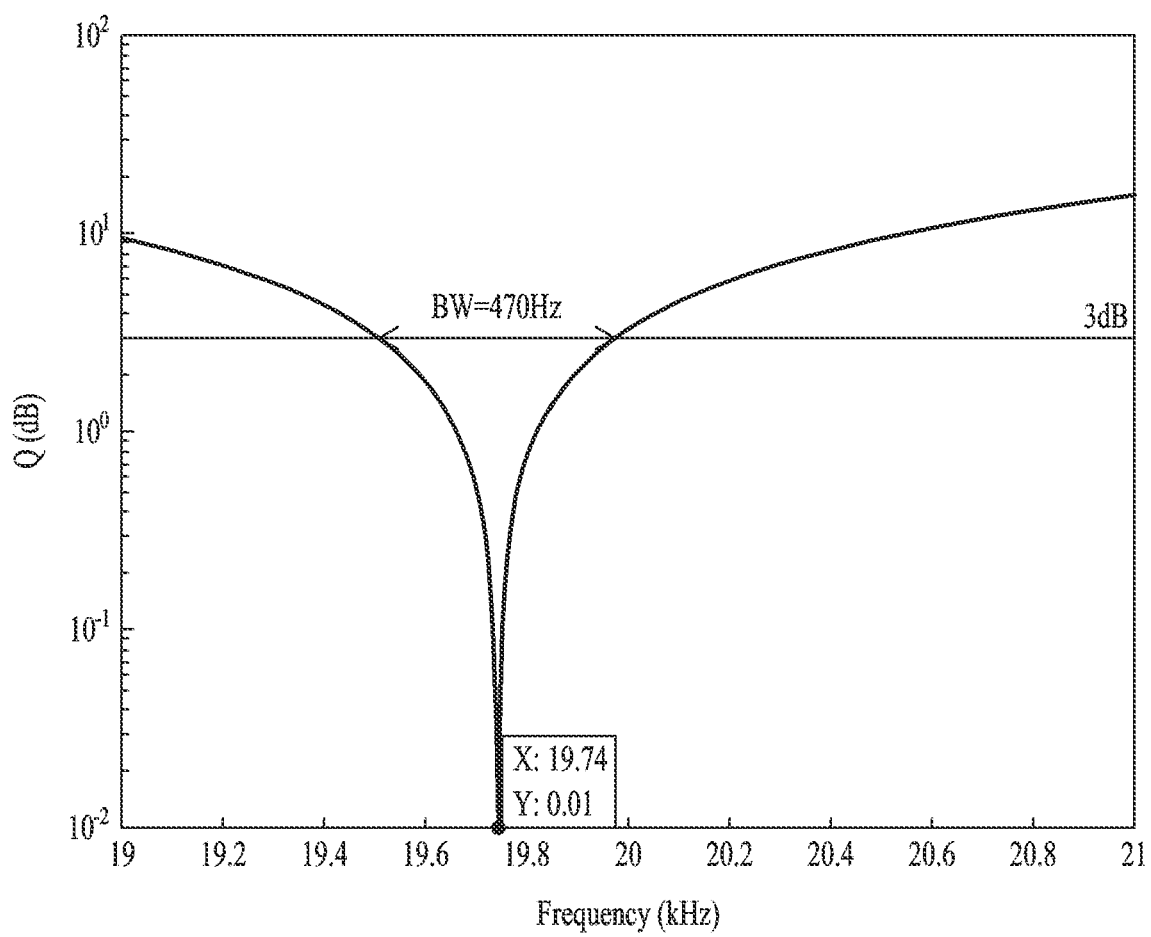
FIG. 8 is a graph illustrating Q values according to a plurality of frequencies measured with an LCR meter for a resonant loop antenna circuit including a second matching circuit and a second loop antenna of FIG. 3.

FIG. 8 illustrates the measured Q value according to the frequency of a second loop antenna with a resonant frequency $f_{c2}$ of 19.95 kHz, measured at a bandwidth (BW2) =450 Hz.

Figure 9:
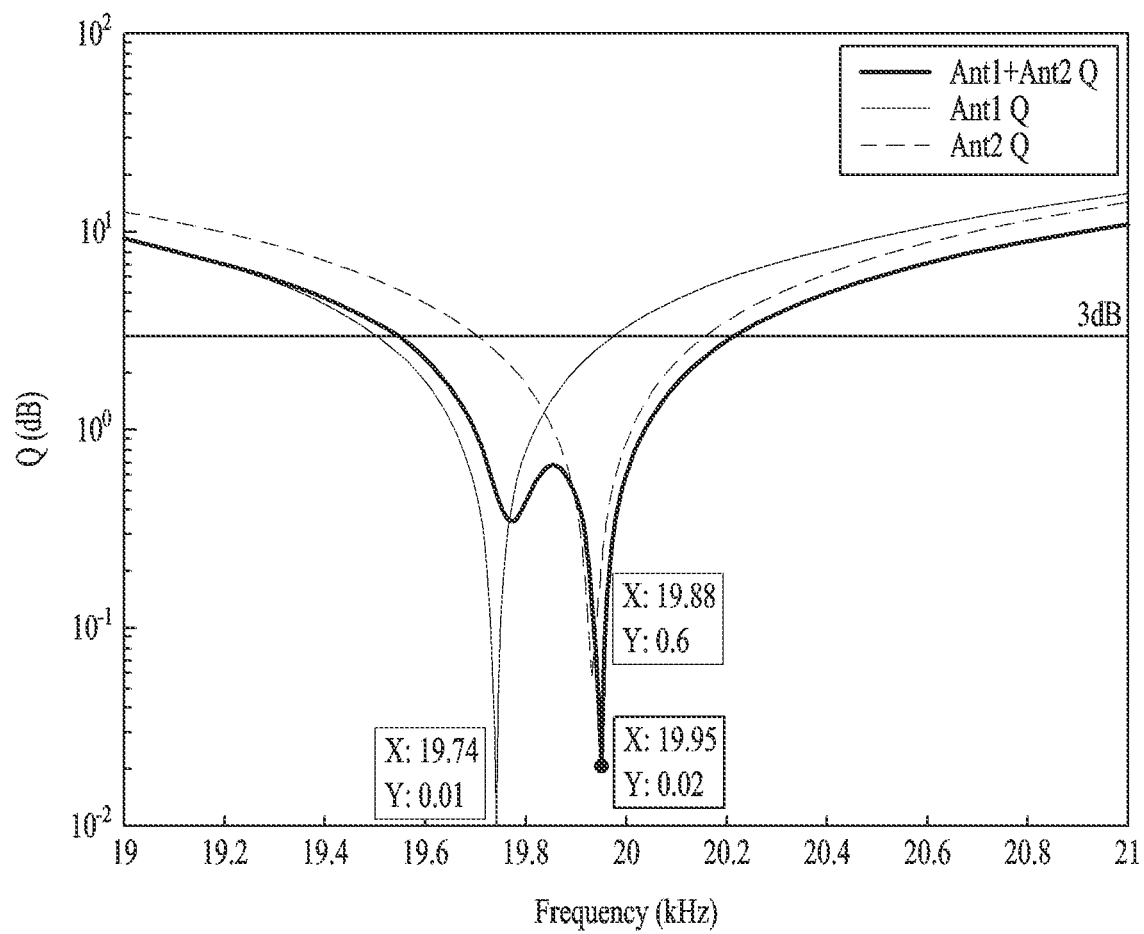
FIG. 9 is a graph illustrating Q values according to a plurality of frequencies measured with an LCR meter for a resonant multi-loop antenna circuit simultaneously using a resonant loop antenna circuit including a first matching circuit and a first loop antenna and a resonant loop antenna circuit including a second matching circuit and a second loop antenna of FIG. 3.

FIG. 9 illustrates the measured Q values according to the frequency after the mutual inductances of the first loop antenna and the second loop antenna are set to zero, measured at a bandwidth of 690 Hz, and the bandwidth is expanded and measured compared to the use of a single loop antenna.

According to the embodiments of the resonant multi-loop antenna circuit described above, a high current may be used even at a low voltage, and the communication bandwidth may be extended by an optimal antenna area increase, so long-distance communication may be possible.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

In the embodiments disclosed herein, the arrangement of the illustrated components may vary depending on the environment or requirements in which the technology is implemented. For example, some components may be omitted or some components may be integrated and implemented as one. In addition, the arrangement order and the connection of some components may change.

What is claimed is:

1. A resonant multi-loop antenna circuit for magnetic field communication, the resonant multi-loop antenna circuit comprising:
    a first loop antenna and a second loop antenna arranged substantially on a same plane;
    a first matching circuit connected in series to the first loop antenna; and
    a second matching circuit connected in series to the second loop antenna,
    wherein the first matching circuit is configured to minimize reactance of the first loop antenna and the first matching circuit connected in series to each other at a first carrier frequency,
    wherein the second matching circuit is configured to minimize reactance of the second loop antenna and the second matching circuit connected in series to each other at a second carrier frequency, and
    wherein the first loop antenna and the second loop antenna are arranged so that a center of the first loop antenna is spaced apart from a center of the second loop antenna by a predetermined distance.

2. The resonant multi-loop antenna circuit of claim 1, wherein
    the first matching circuit comprises a capacitor,
    wherein capacitance of the capacitor of the first matching circuit is determined by the following equation:

$$f_c = \frac{1}{2\pi\sqrt{LC}}$$

where $f_c$ denotes the first carrier frequency, L denotes inductance of the first loop antenna, and C denotes capacitance of the first matching circuit.

3. The resonant multi-loop antenna circuit of claim 1, wherein
    the second matching circuit comprises a capacitor,
    wherein capacitance of the capacitor of the second matching circuit is determined by the following equation:

$$f_c = \frac{1}{2\pi\sqrt{LC}}$$

where $f_c$ denotes the second carrier frequency, L denotes inductance of the second loop antenna, and C denotes capacitance of the second matching circuit.

4. The resonant multi-loop antenna circuit of claim 1, wherein
    the first loop antenna and the second loop antenna are arranged to at least partially overlap.

5. The resonant multi-loop antenna circuit of claim 4, wherein
    the predetermined distance is a distance that makes mutual inductance between the first loop antenna and the second loop antenna become zero.

6. The resonant multi-loop antenna circuit of claim 1, further comprising:
    a third loop antenna arranged substantially on a same plane as the first loop antenna and the second loop antenna; and
    a third matching circuit connected in series to the third loop antenna,
    wherein the third matching circuit is configured to minimize reactance of the third loop antenna and the third matching circuit connected in series to each other at a third carrier frequency, and
    wherein the third loop antenna is arranged so that a center of the third loop antenna is spaced apart from the center of the first loop antenna and the center of the second loop antenna by a predetermined distance.

7. The resonant multi-loop antenna circuit of claim 6, wherein
    the third matching circuit comprises a capacitor,
    wherein capacitance of the capacitor of the third matching circuit is determined by the following equation:

$$f_c = \frac{1}{2\pi\sqrt{LC}}$$

where $f_c$ denotes the third carrier frequency, L denotes inductance of the third loop antenna, and C denotes capacitance of the third matching circuit.

8. The resonant multi-loop antenna circuit of claim 7, wherein the first loop antenna, the second loop antenna, and the third loop antenna are arranged to at least partially overlap.

9. The resonant multi-loop antenna circuit of claim 8, wherein the predetermined distance is a distance that makes mutual inductance between the first loop antenna and the second loop antenna, mutual inductance between the second loop antenna and the third loop antenna, and mutual inductance between the third loop antenna and the first loop antenna become zero.

10. A resonant multi-loop antenna circuit for magnetic field communication, the resonant multi-loop antenna circuit comprising:

a plurality of loop antennas arranged substantially on a same plane; and matching circuits connected in series to the plurality of loop antennas, respectively, wherein the matching circuits are respectively associated with carrier frequencies, wherein each of the matching circuits is configured to minimize reactance of a series connection of a corresponding matching circuit and a loop antenna connected in series to the corresponding matching circuit at the associated carrier frequency, and wherein the plurality of loop antennas is arranged so that centers of the plurality of loop antennas are spaced apart from each other by a predetermined distance.

11. The resonant multi-loop antenna circuit of claim 10, wherein the predetermined distance is a distance that makes mutual inductance between one of the plurality of loop antennas and another one of the plurality of loop antennas become zero.

* * * * *